United States Patent [19]
Kaliski et al.

[11] 3,804,656
[45] Apr. 16, 1974

[54] PIGMENT DISPERSIONS AND USE THEREOF
[75] Inventors: Adam F. Kaliski, Hightstown; Edgar W. Sawyer, Jr., Edison, both of N.J.
[73] Assignee: Engelhard Minerals & Chemicals Corporation, Woodbridge Township, N.J.
[22] Filed: Feb. 22, 1972
[21] Appl. No.: 228,329

[52] U.S. Cl. .................................................. 106/308 Q
[51] Int. Cl. ................................................. C09c 3/00
[58] Field of Search .................... 106/308 Q, 308 N

[56] References Cited
UNITED STATES PATENTS

| | | | |
|---|---|---|---|
| 3,156,574 | 11/1964 | Gomm | 106/308 Q |
| 3,551,553 | 12/1970 | Shannon | 106/308 Q |
| 3,210,209 | 10/1965 | Jones et al. | 106/308 Q |
| 2,809,122 | 10/1957 | Willis et al. | 106/308 Q |
| 2,927,863 | 3/1960 | Marotta et al. | 106/308 Q |

Primary Examiner—Delbert E. Gantz
Assistant Examiner—James W. Hellwege
Attorney, Agent, or Firm—Melvin C. Flint; Inez Y. Moselle

[57] ABSTRACT

A fluid dispersed suspension of clay or other negatively charged pigment or filler is produced by adding the pigment or filler to water in the presence of the combination of a nonionic surface active agent and a cationic surface active agent at an alkaline pH. The resulting suspension may be incorporated into cationic media, e.g., a solution of cationic starch, protein adhesive or cationic latex, to produce improved paper coating compositions. The suspension may be incorporated into a solution of a cationic resin to produce a conductive coating for electrographic reproduction paper. Improved optical performance and printability are obtained when the suspension is employed in the production of a filled paper product.

7 Claims, No Drawings

PIGMENT DISPERSIONS AND USE THEREOF

BACKGROUND OF THE INVENTION

When kaolin clay or other negatively charged pigment or filler is used as an ingredient of an aqueous coating compositions, such as a paper coating color or as a filler for paper, it is conventional practice to disperse the pigment or filler with a negatively charged (anionic) agent such as tetrasodium pyrophosphate, sodium tripolyphosphate or sodium hexametaphosphate in order to provide a high solids slurry having satisfactory rheological properties during handling and/or use. Such slurries are mixed with solutions or dispersions of suitable binders to produce paper coating compositions or they are mixed with suspensions of paper pulp to produce filled paper.

Conventional starches and latex binders or adhesives bear an anionic charge. Consequently, there is little if any incompatibility between these binders and clay or anionic clay dispersants. Thus, dispersions or solutions of negatively charged binders such as conventional starch normally will not flocculate or gel when mixed with high solids dispersions of clay containing anionic dispersants. This is not the case, however, when the adhesives are cationic. When a high solids slip of coating clay which contains a condensed phosphate dispersant in amount to produce minimum apparent viscosity is mixed with a solution of cationic starch, the resulting systems leave much to be desired because of incompatability which is evidenced by loss in pick strength and optical performance of the coating.

The protein shock frequently experienced when formulating high solids coating colors with an anionically dispersed clay slip is another example of the incompatability between anionically dispersed clay and a cationic substance.

Similarly, difficulty is experienced when attempts are made to incorporate clay pigments into aqueous dispersions or solutions of cationic polyelectrolytes of the type used to provide conductive coatings layers for "Electrofax" paper. The negative charge of the conventional clay dispersants counteracts the charge of the conductive resins.

On the other hand, the negative charge of clay dispersed with a conventional dispersant is undesirable when the dispersed clay is added to paper furnish in the production of paper containing a filler to improve properties such as color, opacity or printability. The paper pulp bears a negative charge and a slurry of alum flocced clay therefore tends to pass through the papermaking screens. This represents a loss of raw material and may result in a waste disposal problem.

THE INVENTION

An object of this invention is to provide novel dispersed pigments or fillers of the type which are normally capable of being dispersed with sodium condensed phosphate dispersants, which novel dispersed pigments or fillers produce improved results when utilized in some applications in which phosphate dispersed systems have heretofore been used with less than optimum results.

Another object is the provision of concentrated dispersed slurries of pigments which are sufficiently stable for shipment, are free from phosphate dispersants and may be used in the manufacture of a variety of pigment-filled or pigment-coated paper products, including systems containing positively charged adhesives and/or resins, or negatively charged fibers.

A specific object is to provide novel concentrated, fluid dispersed kaolin slurries which are free from phosphates.

Briefly stated, in accordance with the present invention, a negatively charged filler or pigment such as kaolin clay contains as the dispersant a combination of nonionic and cationic surface active agents and is rendered moderately or strongly alkaline by the addition of strong base.

The novel dispersed pigment composition is supplied as a pre-dispersed aqueous slurry or as a dried product. Such composition is produced by adding a mixture of the nonionic and cationic dispersants to the pigment in the presence of water while adding a strong base to maintain the system alkaline.

In an embodiment of the invention, the pigment dispersion (slurry) of the present invention is mixed with cationic starch, protein adhesive or suitable cationic latexes to form a paper coating composition. This obviates the incompatability which frequently occurs when phosphate dispersants are employed in the formulation of such compositions. In many cases, a spectrum of improvements in coated sheet properties is realized.

In another embodiment of the invention an aqueous pigment dispersion of the present invention is used to fill paper. Increased filler retention and improved sheet opacity are realized by substituting the novel dispersant for a conventional phosphate dispersant.

In another embodiment, a novel pigment dispersion of this invention is mixed with a solution or dispersion of a synthetic cationic resin to produce a coating composition for application to paper to provide an electroconductive layer thereon.

PRIOR ART

The art is replete with suggestions to employ various surfactants, including cationics and nonionics, to improve the dispersibility of clays in organic liquids, especially those of nonpolar nature. U.S. Pat. No. 2,797,196 to Thomas H. Dunn et al., is an example. To the best of our knowledge, the desirability of producing cationically dispersible clays and the like for aqueous coating compositions has been recognized but has not met with success.

DETAILED DESCRIPTION

An essential feature of our invention resides in the use of a combination of nonionic and cationic surface active agents. When used alone cationic surfactants are incapable of providing predispersed aqueous pigment suspensions having suitable rheological properties. The rheological properties obtained by using nonionic dispersants alone may be satisfactory but the slurries lack stability. Furthermore, sheets having desired optical properties are not obtained when such slurries are used for paper coating and filling applications.

Another feature of the invention resides in the use of a strong base along with the mixture of surfactants. In the absence of the base, slurries of adequate solids concentration cannot be obtained. For example, kaolin slurries containing no more than 25 percent clay solids are obtained when a base is absent whereas 60 percent to 65 percent solids slurries of comparable viscosity may be prepared when a strong base is utilized. However, a strong base such as sodium hydroxide is unsuitable as the sole dispersant since the resulting suspensions will be unstable.

While we do not wish to be bound by any theory or explanation as to the function or role of the individual components of our dispersant system, it is believed that the nonionic surfactant and the hydroxyl ion derived from the strong base function as the dispersants. It is believed that the cationic component reacts with selective anionic sites on the clay particles, preventing alkaline decomposition of the clay and also permitting the nonionic surfactant to function as a dispersant. Further, the cationic agent has a higher surface charge density than an anionic dispersant of equivalent charge number and molecular weight. Thus, the cationic agent is believed to affect the state of aggregation of the fines by selectively flocculating them and coarsening the overall floc structure, thereby increasing the light scattering power of the pigment or pigment-binder formulations towards the longer light wavelengths.

The invention is applicable to the processing of the following normally negatively-charged pigments or fillers: hydrous and essentially anhydrous (calcined) clays, especially kaolin clays, attapulgite clay, zeolites, calcium carbonate, talc, titania, carbon black, calcium sulfate (natural and synthetic), barium sulfate (natural or synthetic), and mixtures of two or more of the aforementioned. The pigments or fillers should be free from condensed phosphate and other strongly anionic polyelectrolytes such as sodium silicate, polysulfonates, polyphosphonates and polycarboxylates. Further, the pigments and fillers should be free from oil, which will impair optical properties of the pigments and fillers.

The invention is of especial benefit with regard to the provision of novel predispersed hydrated kaolin clay products and will be described hereinafter with particular reference to such use.

The starting clay may be a moist or dry acidic filter cake obtained by conventional wet processing of naturally occurring kaolin clay.

The nonionic dispersant must be soluble in water in amount of at least 0.5 percent in distilled water at 70°C. and it must be stable at high pH, e.g., a pH above 8.5. The nonionic material must have a proper "H/L" balance to provide finished slurries with acceptable viscosity stability and to provide desirable optical performance. The following are suitable: ethylene oxide condensates of alkyl phenols; ethylene oxide condensates of alcohols such as octyl alcohol; ethylene oxide condensates of thioalcohols; ethylene condensates of thiophenols; mixed condensed polyethylene polypropylene glycols. Presently preferred are condensates of alkyl phenols with 6 to 16 moles ethylene oxide, the alkyl chain on the phenol containing from 4 to 9 carbon atoms; e.g., octylphenol condensed with 10 moles ethylene oxide (available commercially as Triton X-100).

The cationic surface active agent must be soluble to the extent of at least 0.5 percent in distilled water at 70°C. and must possess latent dispersant properties (as opposed to flocculating properties) when utilized in practice of the invention. More specifically, the cationic surface active agent must be one capable of forming a blend with the nonionic dispersant and pigment at an alkaline pH such that the resulting slurry has workable viscosity, adequate viscosity stability and compatibility with cationic adhesives. Preferred are cationic compounds which possess high surface activity with regard to their ability to disperse pigments in water. Preferred are nonpolymeric quaternary ammonium salts, examples of which are lauryldimethyl benzyl ammonium chloride, lauryltrimethyl ammonium chloride, di-isobutyl phenoxy ethoxy ethyl dimethylbenzyl ammonium chloride ("Hyamine 1622"). Mixtures of cationic surface active compounds may also be employed. An example is "Hyamine 2389", which comprises methyl dodecylbenzyl trimethyl ammonium chloride and methyl dodecyl xylene bis(trimethyl ammonium chloride).

The nonionic dispersant is used in amount within the range of 0.1 percent to 0.5 percent, based on the weight of the pigment or filler. When used in insufficient amount, the pigment will be inadequately dispersed. An excess results in undesirable foaminess. Cationic surface active agent is employed in amount within the range of 0.1 percent to 0.5 percent of the pigment or filler. The ratio of nonionic surfactant to cationic surfactant depends on the species of pigment and end use of the product. Such ratio generally is within the range of from about 20 to 80 parts by weight nonionic surfactant to 80 to 20 parts by weight cationic surfactant. Generally, a larger amount of nonionic compound is employed and the total weight of nonionic and cationic materials generally will not exceed 0.5 percent based on the weight of the pigment.

Strong base is employed in amount sufficient to impart a pH of at least 8 to the mixture of pigment and surfactants. Preferably, sufficient base is added to impart a pH within the range of 8.5 to 11. In some cases the pH should be as high as 13. Optimum pH varies with the nature of the cationic media in which the pigment is to be used and with the pigment species. Sodium hydroxide is the preferred strong alkali. Lithium and potassium hydroxide are also useful. Other strong bases are tetramethyl ammonium hydroxide and tetraethyl ammonium hydroxide.

The solids of the predispersed aqueous pigment suspensions vary with the nature of the pigment and generally are in a range that is consistent with the provision of slurries which have workable, stable viscosity and do not exhibit excessive settling. These suspensions, especially when formulated at high solids, are low energy gels — that is, they are thin gels which flow rapidly when subjected to low energy shearing. In the case of kaolin clay coating pigments, slurries containing up to 65 percent solids or higher may be produced at useable viscosities. With kaolin filler clays, lower solids, e.g., 45 percent solids, may be desirable and, generally, less total nonionic and cationic surfactants should be used during processing to obtain optimum results with clays intended for paper filling use.

Virtually all cationic starches, protein adhesives and cationic latexes that are suitable for use in alkaline media may be used in putting our invention into practice. Such starch or latex may be used in partial or complete replacement of an ordinary starch binder or it may be employed in conjunction with other binders such as conventional anionic synthetic latices (styrene-butadiene latex).

Our novel clays may be employed with cationic starches in various aqueous coating compositions, especially compositions for coating lightweight publication papers and other printing papers, and for surface sizing. Cationic starch has many advantages over anionic starch when used for surface sizing. However, size-press formulations normally include anionically dispersed clay and ionic interaction between the cationic polymer and dispersant may occur. These difficulties may be obviated by practicing our invention.

Cationic starch derivatives are produced by reacting starch through etherification or esterification with any reagent which will introduce into the starch a cationic substituent containing nitrogen, sulfur or phosphorus. Primary, secondary or tertiary substituents may be introduced. Commercial cationic starches, which are presently preferred because of their availability, usually are tertiary aminoalkyl ethers of starch resulting from the reaction of starch under alkaline conditions with a dialkyl amino alkyl epoxide or halide or with corresponding compounds containing aryl in addition to alkyl groups. Reference is made to U.S. Pat. No. 2,813,092 to Caldwell issued Nov. 12, 1957. Cationic starches are produced in grades of high, medium and low viscosity. Our predispersed pigments may be used with any of these grades.

In general, conventional techniques may be used in preparing the aqueous coating colors with cationic starch and our novel predispersed pigments. Reference is made to the following publications as to the details of preparing and using clay coating colors based upon cationic starch derivatives:

E. D. Mazarella and L. J. Hickey, "DEVELOPMENT OF CATIONIC STARCHES AS PAPER COATING BINDERS," TAPPI, Vol. 49, No. 12, December 1966, pages 526 to 532.

Donald S. Grief, "CATIONIC STARCHES AS PAPER COATING BINDERS," TAPPI, Vol. No. 3, March 1960, pages 254 to 260.

These procedures are modified by substituting our novel slurries of predispersed pigments for the phosphate dispersed slurries described in the publications. Further, substantially higher levels of clay or other negatively charged pigments may be employed when employing our novel slurries.

While our dispersed clay (or other pigment) suspensions may be used with cationic starches, they also produce satisfactory results, generally comparable to those obtainable with phosphate dispersants, when used with conventional starches or other anionic binders. Thus, the suspensions are remarkably versatile in their utility.

Our novel predispersed pigments may also be used with a water-dispersible or water-soluble polycationic resin to saturate a base sheet or to provide a conductive coating useful, for example, under a photosensitive coating in direct transfer electrostatic paper, e.g., "Electrofax". A type of cationic resin useful in producing such coatings is described in U.S. Pat. No. 3,011,918 to L. H. Silvernail and Marion W. Zimbal, Dec. 5, 1961. The resins are homopolymers or copolymers of two or more vinylbenzyl quaternary ammonium compounds. Methods of coating paper with aqueous coating compositions contain such resins are described in the Silvernail patent. Other cationic polymers are described in a publication by M. F. Hoover and H. E. Carr, TAPPI 51 (12); 552 (1968). Hoover and Carr also suggest the extension of such conductive barrier coatings with pigments such as clay to reduce blocking and to increase sheet brightness. A typical formulation is: No. 1 coating clay, 50 parts (by weight); anionic starch, 25 parts; cationic polymer, 25 parts.

The formulations may be applied by size-presses, air knives or blades.

The paper filling techniques described in Fanselow patent U.S. Pat. No. 3,586,523, dated June 22, 1971 may be employed to fill paper with predispersed slurries or dried pigments of the invention.

Our invention may be better understood and some of the advantages and benefits thereof more apparent from the following examples, selected for illustrative purposes only.

EXAMPLE I

In accordance with the present invention, a 60 percent solids slurry of dispersed kaolin clay is prepared from the following materials.

| | |
|---|---|
| Pulverized No. 1 grade kaolin coating clay (acid form) | 60 lbs. |
| Triton X-100[1] | 0.108 |
| Hyamine 1622[2] | 0.072 |
| 10 percent NaOH solution | 2.30 lbs. |
| Water | 37.52 lbs. |
| | 100.00 |

[1] octyl phenoxy polyethoxy ethanol
[2] di-isobutyl phenoxy ethoxy ethyl dimethylbenzyl ammonium chloride To prepare the clay dispersion, add the sodium hydroxide to the necessary amount of water and add the clay with agitation. When all of the clay has been incorporated, add the Hyamine 1622 while continuing stirring. This tends to floc the system. The floc is broken when the Triton X-100 is added. A medium-torque mixer such as a Cowles dissolver is recommended for mixing. The final pH of the slurry is within the range of 10.5 to 11.5.

EXAMPLE II

This example illustrates the superiority of a blend of nonionic and cationic surfactants over a conventional phosphate salt as a dispersant for a kaolin clay slurry used in filling paper.

A control slurry was prepared in conventional manner by dispersing a No. 1 coating kaolin clay in water using tetrasodium pyrophosphate as the dispersant in amount of 0.3 percent of the dry clay weight. The slurry was prepared at 60 percent solids using makedown techniques conventional in the industry.

An experimental slurry of the same clay was prepared as in Example I, using a combination of nonionic and cationic surface active agents in combined amount of 0.3 percent of the clay weight (0.12 percent Hyamine 1622 and 0.18 percent Triton X-100) and sodium hydroxide solution to a pH of 11.0. The slurry solids was 60 percent. Other experimental slurries were prepared in identical manner, substituting Triton X-114, Triton X-165, Triton X-305 for the Triton X-100. The "Tritons" differ in their H/L balances. As mentioned, Triton X-100 is octylphenol condensed with 10 moles ethylene oxide. Triton X-114, X-165 and X-305 are octylphenols condensed with 7 to 8, 16 and 30 moles ethylene oxide, respectively.

The slurries were used in making paper handsheets, following typical practice of the industry substantially as set forth in U.S. Pat. No. 3,586,523 to Fanselow. Alum was used as the floccing agent. Results for the tests, carried out at a nominal 10 percent filling level, are shown in Table I.

Data in Table I for filler retention show that retention was increased in all cases by substituting the blend of cationic and nonionic surfactants for tetrasodium pyrophosphate (TSPP). In the case of the blend of Hyamine 1622 and Triton X-114, filler retention was almost doubled.

Opacity data in Table I show that all of the sheets prepared with the experimentally dispersed clays had higher unfinished and calendered opacity values than sheets filled with the control slurry. As expected, the relative improvements in opacity corresponded to the relative improvement in retention realized when nonionic surfactants of different H/L balance were used.

at 51.3 percent solids and pH levels of 5.6 and 10.1 to permit evaluation of the effect of variation of pH on coating properties. The experimental coating color was prepared at 49.7 percent solids and pH levels of 8.9 and 10.4, again to permit a comparison of the effect of variation of pH on coating performance when using the conventional phosphate dispersant and our novel dispersant combination.

The coating formulations were applied to a typical lightweight publication paper base sheet (felt side only) with the use of the common hand-drawdown technique employing Meyer rods. The freshly coated sheets were air dried on stretcher boards. Sheets with dimensions

TABLE I

COMPARISON OF RETENTION LEVELS AND OPTICAL PERFORMANCE OF PAPER HANDSHEETS FILLED WITH NO. 1 CLAY DISPERSED WITH VARIOUS SURFACTANT SYSTEMS

| Experimental Dispersant Systems | | | | | Elrepho |
|---|---|---|---|---|---|
| Hyamine 1622 (cationic), wt. % | Triton X (nonionic), wt. % | Filler Retention, % | Opacity, % Unfinished | Opacity, % Calendered | Refl., 457 nm Calendered |
| 0.12 | X-45) * / X-114)    0.18 | 18.4 | 85.2 | 82.0 | 84.4 |
| 0.12 | X-114    0.18 | 29.8 | 87.3 | 85.1 | 84.2 |
| 0.12 | X-100    0.18 | 20.0 | 86.0 | 82.9 | 84.3 |
| 0.12 | X-165    0.18 | 18.3 | 85.5 | 82.2 | 84.5 |
| 0.12 | X-305    0.18 | 19.4 | 86.0 | 82.8 | 84.6 |
| Control Dispersant System, 0.3% TSPP | | 16.8 | 84.9 | 81.7 | 84.5 |

* Ratio 1 part X-45 to 3 parts X-114 (wt.)

EXAMPLE III

This example illustrates the utility of a novel dispersed coating clay slurry of the invention as an ingredient of a coating color containing cationic starch. The example illustrates the superiority of our dispersant system over a conventional phosphate dispersant in a cationic coating color.

In the example the cationic starch was employed at a binder level of 14 parts per 100 parts clay in order to evaluate our dispersed clay with respect to coating pick vs. optical performance at a low binder level. A low binder level is generally desirable from both economic and optical performance standpoints as long as an acceptable coating-pick strength is obtained.

The starting clay was "Stellar," an undispersed (acid) No. 1 grade coating clay. In the control test, this kaolin clay was dispersed with 0.3 percent by weight TSPP at 70 percent solids. In the experimental test, another portion of the clay was dispersed at 60 percent solids with 0.3 percent by weight of a 40/60 blend (wt.) of Hyamine 1622 and Triton X-100 at a pH of 11.0, as described in Example I.

The cationic starch used in the examples was "Cato Kote" 470, medium viscosity grade, understood to be a tertiary amino alkyl starch ether.

The starch solution was cooked at 35 percent solids and mixed at elevated temperature with the clay dispersion to produce coating formulations at 55 percent solids. Conventional makedown procedures were used. The formulations were then diluted to obtain Brookfield viscosities of about 3,000 cp. at 10 r.p.m. using the No. 3 spindle. The control coating color was prepared equal to 8% X 11 inches were then cut with the use of a templet and evaluated for optical properties in both the unfinished and supercalendered state (four passes at a nominal pressure of 500 p.l.i., cold).

Conventional (TAPPI) procedures were employed to measure sheet gloss and opacity while the Elrepho instrument was used to measure sheet brightness before and after calendering. The IGT test was employed to measure the coating pick. Results are summarized in Table II along with calculated values extrapolated to coat weights of 10 g./m$^2$.

Brightness data in Table II show that the experimental coating colors produced much brighter calendered sheets than the control colors when used at both high and low pH levels. In both cases brightness was greater at high pH. Brightness data (not included in the table) for uncalendered sheets indicated the same trends.

Data in Table II for opacity performance indicate the same trends that were observed in brightness performance. However, the corresponding numerical differences were less dramatic.

Gloss data in Table II indicate comparable gloss performance. A comparison of calendered gloss values with uncalendered gloss values for the sheets (not included in Table II) indicates that all sheets had equivalent glossing potential during supercalendering.

The pick data in Table II shows that the sheets coated with the experimental system at high and low pH had higher pick values than sheets coated with the control colors. The low pick values with the control coating system indicate that an adverse interaction had taken place between the cationic starch and the anionically dispersed clay.

Thus, an overall comparison of data in Table II indicated that our novel dispersants resulted in coated sheets having markedly superior brightness and opacity, at comparable gloss when the cationic starch coating color was used at high pH and slightly less superiority when the experimental coating color was used at low pH.

When the coated calendered sheets referred to in Table II were evaluated for printability, it was found that the sheets coated with formulations containing our novel predispersed clays gave exceptionally good results. Particularly notable was the extremely low ink set-off.

By way of further comparison, base sheets were coated with a conventional coating system, i.e., anionic starch ("Stayco" M) at 17 parts per 100 parts clay using "Stellar" dispersed at 70 percent solids with 0.3 percent TSPP dispersant. This formulation produced calendered sheets having pick values comparable to those of sheets obtained using 14 parts of the cationic starch per 100 parts of the novel dispersed clay. The sheets were calendered and optical properties measured and compared to the properties obtained with the experimental coating colors (14 parts cationic starch to 100 parts clay dispersed with our combination of nonionic and cationic surfactants at high pH). It was found that the experimental coating colors produced calendered sheets which were brighter, appreciably more opaque and only minimally lower in gloss than the conventionally coated sheets. On the other hand, the sheets coated with the cationic starch and clay dispersed with 0.3 percent TSPP were less bright and opaque and had lower pick than the sheets coated with the above-described conventional formulation. Such results indicate that the improved optical properties obtained with the cationic starch were attributable to the use of our combination of nonionic and cationic surfactants rather than to the use of the cationic starch per se.

2. The modified pigment of claim 1 wherein the pigment is kaolin clay.

3. An aqueous suspension suitable for use in filling or coating paper comprising particles of a pigment which normally bears an anionic charge, and, as a dispersant, a mixture consisting essentially of a nonionic surface active agent, a cationic surface active agent and a strong base in amount such that said suspension has a pH of at least 8, said nonionic surface active agent and said cationic surface active agent being present in combined amounts not to exceed 0.5 percent of the weight of said pigment particles.

4. An aqueous suspension suitable for use in filling or coating paper and comprising particles of kaolin clay, from 0.1 percent to 0.5 percent of the clay weight of a nonionic surface active agent which is a condensate of an alkylphenol with 7 to 16 moles ethylene oxide, the alkyl chain on the alkylphenol containing 4 to 9 carbon atoms, from 0.1 percent to 0.5 percent of the clay weight of a cationic surface active agent which is a quaternary ammonium salt, the weight ratio of nonionic surface active agent to cationic surface active agent being from 20:80 to 80:20, and sodium hydroxide in amount such that said suspension has a pH above 8.5, said suspension being free from condensed phosphate and alkali metal silicate dispersants.

5. A clay suspension consisting essentially of water, kaolin clay in amount sufficient to form a dispersion containing at least 45 percent clay solids and, as a dispersant, a mixture consisting essentially of a water-soluble nonionic surface active agent, a cationic surface active agent and alkali metal hydroxide in amount sufficient to provide a pH in the range of 8 to 13, said nonionic surface active agent and said cationic surface active agent being present in combined amounts not to exceed 0.5 percent of the weight of said pigment particles.

6. A modified kaolin clay pigment comprising particles of kaolin clay mixed with a dispersant consisting essentially of the combination of a nonionic surface active agent and a cationic surface active agent in combined amounts not to exceed 0.5 percent of the clay

TABLE II

EFFECT OF VARIATION OF CLAY DISPERSANT ON PROPERTIES OF LIGHTWEIGHT PAPER COATED WITH CATIONIC STARCH Formulation

| | Dispersant | | | |
| --- | --- | --- | --- | --- |
| | TSPP, 0.3% | TSPP, 0.3% | Cationic & Nonionic 0.3% | Cationic & Nonionic 0.3% |
| Coating Color pH | low | high | low | high |
| Coat Weight | 9.6 | 8.2 | 8.0 | 7.3 |
| Calendered Coated Sheet Properties | | | | |
| Brightness, % | 67.2 | 67.1 | 68.0 | 68.1 |
| Δ* Brightness per 10 g./m², % points | 5.6 | 6.5 | 7.8 | 8.6 |
| TAPPI Opacity, % | 88.4 | 88.3 | 88.7 | 88.7 |
| Δ* Opacity per 10 g./m², % points | 5.2 | 6.0 | 6.6 | 7.3 |
| 75° gloss, % | 45.3 | 41.9 | 40.1 | 39.7 |
| Δ* Gloss per 10 g./m², % points | 28.0 | 28.7 | 27.1 | 29.2 |
| IGT Pick, VVP × 10⁴ | 1.0 | 1.2 | 1.4 | 1.5 |

Δ* = Increase

We claim:

1. A modified pigment for coating or filling paper comprising a finely divided anionic pigment and, as a dispersant, a mixture consisting essentially of a water-soluble nonionic surface active agent, a cationic surface active agent and a strong base in amount such that an aqueous dispersion of the pigment has an alkaline pH, said nonionic surface active agent and said cationic surface active agent being used in combined amount not to exceed 0.5 percent of the weight of said pigment particles.

weight and in weight ratio in the range of 20:80 to 80:20, and sodium hydroxide in amount such that an aqueous suspension of the modified pigment has a pH of at least 8.

7. The modified clay pigment of claim 6 wherein the nonionic surface active agent is a condensate of an alkylphenol with 7 to 16 moles ethylene oxide, the alkyl chain on the alkylphenol containing 4 to 9 carbon atoms and the cationic surface active agent is a quaternary ammonium salt.

* * * * *